US009560799B2

(12) United States Patent
Hishida

(10) Patent No.: US 9,560,799 B2
(45) Date of Patent: Feb. 7, 2017

(54) ROTATING BODY FOR MOWER

(75) Inventor: Tadashi Hishida, Sakai (JP)

(73) Assignee: VIV ENGINEERING INC., Sakai-shi (JP)

( * ) Notice: Subject to any disclaimer, the term of this patent is extended or adjusted under 35 U.S.C. 154(b) by 585 days.

(21) Appl. No.: 14/009,618

(22) PCT Filed: Apr. 5, 2012

(86) PCT No.: PCT/JP2012/059379
§ 371 (c)(1),
(2), (4) Date: Nov. 19, 2013

(87) PCT Pub. No.: WO2012/141077
PCT Pub. Date: Oct. 18, 2012

(65) Prior Publication Data
US 2014/0083067 A1   Mar. 27, 2014

(30) Foreign Application Priority Data

Apr. 15, 2011 (JP) .................................. 2011-090653
Mar. 21, 2012 (JP) .................................. 2012-063056

(51) Int. Cl.
*A01D 34/00* (2006.01)
*A01D 34/416* (2006.01)

(52) U.S. Cl.
CPC ......... *A01D 34/4166* (2013.01); *A01D 34/416* (2013.01)

(58) Field of Classification Search
CPC .............. A01D 34/416; A01D 34/4166; A01D 34/4161; A01D 34/4163; A01D 34/4165; A01D 34/4168; A01D 34/84

USPC .................................... 56/12.7; 30/347, 276
See application file for complete search history.

(56) References Cited

U.S. PATENT DOCUMENTS

| 3,859,776 A | * | 1/1975 | Ballas | A01D 34/416 56/12.7 |
| 4,043,103 A | * | 8/1977 | Lakin | A01D 34/416 30/276 |
| 4,097,991 A | * | 7/1978 | Proulx | A01D 34/416 30/276 |
| 4,152,832 A | * | 5/1979 | Akaike | A01D 34/416 30/276 |

(Continued)

FOREIGN PATENT DOCUMENTS

DE   102012002088 A1 * 8/2013 ......... A01D 34/4161
GB     1562948 A   * 3/1980 ........... A01D 34/416

(Continued)

*Primary Examiner* — Thomas B Will
*Assistant Examiner* — Joan D Misa
(74) *Attorney, Agent, or Firm* — Kratz, Quintos & Hanson, LLP

(57) ABSTRACT

To provide a mower with which a mowing cord can be kept in an appropriate protruding state, in a mower in which a mowing cord 11 of resin is wound on a rotating body 1, the rotating body 1 is provided with a winding member 3 on which the mowing cord 11 is wound, the winding member 3 has a first peripheral concave groove 38 and a second peripheral concave groove 39 on which the mowing cord 11 is wound, and a winding portion 11d of the mowing cord 11 is wound as to be aligned from an inner side in a diameter direction to an outer side within each of the first peripheral concave groove 38 and the second peripheral concave groove 39.

4 Claims, 12 Drawing Sheets

(56) References Cited

U.S. PATENT DOCUMENTS

| | | | | |
|---|---|---|---|---|
| 4,162,575 A * | 7/1979 | Ballas | A01D 34/4165 | 242/118.4 |
| 4,169,311 A * | 10/1979 | Evenson | A01D 34/4161 | 30/276 |
| 4,259,782 A * | 4/1981 | Proulx | A01D 34/4163 | 30/276 |
| 4,271,595 A * | 6/1981 | Rahe | A01D 34/416 | 30/347 |
| 4,310,970 A * | 1/1982 | Evenson | A01D 34/4161 | 30/276 |
| 4,550,498 A * | 11/1985 | Oliver | A01D 34/416 | 30/276 |
| 4,569,134 A * | 2/1986 | Kobayashi | A01D 34/416 | 30/347 |
| 4,625,501 A * | 12/1986 | Baba | A01D 34/416 | 30/276 |
| 4,672,798 A * | 6/1987 | Ota | A01D 34/4163 | 30/276 |
| 4,702,005 A * | 10/1987 | Pittinger, Sr. | A01D 34/4163 | 30/276 |
| 5,222,301 A * | 6/1993 | Sugihara | A01D 34/4161 | 30/276 |
| 5,311,665 A * | 5/1994 | Sugihara | A01D 34/4162 | 30/276 |
| 5,490,641 A * | 2/1996 | Worthing | A01D 34/416 | 242/587 |
| 6,851,191 B2 * | 2/2005 | Arnetoli | A01D 34/4163 | 30/276 |
| 6,944,954 B1 * | 9/2005 | Arnetoli | A01D 34/4163 | 30/276 |
| 6,952,877 B2 * | 10/2005 | Pfaltzgraff | A01D 34/4163 | 30/276 |
| 8,707,567 B2 * | 4/2014 | Proulx | A01D 34/4165 | 30/276 |
| 2011/0214301 A1 * | 9/2011 | Proulx | A01D 34/416 | 30/347 |
| 2015/0342116 A1 * | 12/2015 | Sprungman | A01D 34/4163 | 30/276 |

FOREIGN PATENT DOCUMENTS

| | | | | |
|---|---|---|---|---|
| GB | DE 202014105254 U1 * | 2/2015 | | A01D 34/4161 |
| JP | 2006000111 A | 1/2006 | | |
| JP | 2009225741 A * | 10/2009 | | |

\* cited by examiner

ROTATING BODY FOR MOWER

FIELD OF THE INVENTION

This invention relates to a mower.

BACKGROUND ART

Conventionally, in a mower, in which a resin mowing cord is wound on a rotating body that rotates around a vertical axis, the rotating body is provided with an upper lid member and a winding member on which the mowing cord is wound, and the upper lid member has a cylindrical contact shaft portion to which the mowing cord drawn out by centrifugal force is hitched.

PRIOR ART DOCUMENT

Patent Document

Patent document 1: Japanese Patent Provisional Publication NO. 2006-111.

OUTLINE OF THE INVENTION

Problems to be Solved by the Invention

However, in the conventional mower, the mowing cord may intrudes between a lower face of the contact shaft portion and an outer brim portion of the winding member, goes beyond (passes) the contact shaft portion, and protrudes unnecessarily long. That is to say, the mowing cord can't be kept in an appropriate protruding state, mowing cords may be entangled each other and wound around grass and trees, and mowing ability, mowing efficiency, and operation ability are reduced.

And, in the conventional mower, as shown in FIG. 14, mowing cords 90 are layered around a peripheral concave groove 99 of the winding member in vertical direction, contact area of the cords is large, fusion is caused by frictional heat, the mowing cords 90 are not smoothly sent out for entanglement into a lump and not kept in the appropriate protruding state.

Therefore, it is an object of the present invention to provide a mower with which the mowing cords can be kept in the appropriate protruding state.

Means for Solving the Problems

To achieve the object above, the mower of the present invention is a mower in which a mowing cord of resin is wound on a rotating body, the rotating body is provided with a winding member on which the mowing cord is wound, and the winding member has a first peripheral concave groove and a second peripheral concave groove on which the mowing cord is wound, and a winding portion of the mowing cord is wound as to be aligned from an inner side in a diameter direction to an outer side within each of the first peripheral concave groove and the second peripheral concave groove.

And, a groove width dimension of the first peripheral concave groove and a groove width dimension of the second peripheral concave groove are set to be equal to or more than a diameter dimension of the mowing cord and less than 2 times of the diameter dimension of the mowing cord.

And, the winding member is provided with a rotating main body member of resin having a cylindrical trunk portion, and a ring member of metal mounted on the cylindrical trunk portion and having the first peripheral concave groove and the second peripheral concave groove.

And, the ring member is detachably and changeably attached to the cylindrical trunk portion of the rotating main body member.

And, the ring member has a hitching protruding portion, to which an end of the wound mowing cord is hitched, protruding outward in radial direction.

And, the ring member has a short cylinder portion, and an upper end brim portion, a middle brim portion, and a lower end brim portion protruding outward in radial direction from an upper end, a middle portion, and a lower end of the short cylinder portion, and the ring member has a pair of proximate through hole disposed on the upper end brim portion or the lower end brim portion for insertion of the mowing cord, and a through window portion disposed on the middle brim portion near the pair of through holes to connect the first peripheral concave groove and the second peripheral concave groove.

And, in a mower in which a mowing cord of resin is wound on a rotating body, the rotating body is provided with an upper lid member and a winding member having a cylinder portion on which the mowing cord is wound, the winding member has an upper outer brim portion protruding from the cylinder portion (and a lower outer brim portion larger than the upper outer brim portion in diameter, the upper lid member has plural contact shaft portions for adjustment of cord protruding length protruding downward along a periphery, and the contact shaft portion has a cord guiding brim portion on a lower end to prevent intrusion of the mowing cord between a lower face of the contact shaft portion and the lower outer brim portion.

And, in a mower in which a mowing cord of resin is wound on a rotating body, the rotating body is provided with an upper lid member and a winding member having a cylinder portion on which the mowing cord is wound, the winding member has an upper outer brim portion protruding from the cylinder portion and a lower outer brim portion larger than the upper outer brim portion in diameter, the upper lid member has plural shaft members protruding downward along a periphery, and a contact shaft portion for adjustment of cord protruding length is formed on the upper lid member by fitting and fixation of a cylindrical member widening downward in diameter onto the shaft member, and a cord guiding brim portion is formed on a lower end of the contact shaft portion to prevent intrusion of the mowing cord between a lower face of the contact shaft portion and the lower outer brim portion.

And, in a mower in which a mowing cord of resin is wound on a rotating body, the rotating body is provided with an upper lid member and a winding member having a cylinder portion on which the mowing cord is wound, the winding member has an upper outer brim portion protruding from the cylinder portion and a lower outer brim portion larger than the upper outer brim portion in diameter, the upper lid member has plural contact shaft members, penetrating a circular top portion in vertical direction, along a periphery, the contact shaft member has an insertion shaft portion, protruding upward from the top portion, of which upper end is fixed to the top portion by caulking, and a bell-shaped lower end portion protruding downward from the top portion and formed widening downward in diameter, a contact shaft portion for adjustment of cord protruding length is formed with the downward protruding portion of the contact shaft member on the upper lid member, and a cord guiding brim portion is formed with the bell-shaped lower end portion on a lower end of the contact shaft portion to prevent intrusion of the mowing cord between a lower face of the contact shaft portion and the lower outer brim portion.

Effects of the Invention

According to the present invention, the mowing cord can be prevented from protruding unnecessarily large out of the rotating body, and the appropriate protruding state can be kept. The entanglement and fusion of the cords can be prevented, and grass mowing (cutting) work can be easily and smoothly conducted with good efficiency.

EMBODIMENTS OF THE INVENTION

Figure 1:
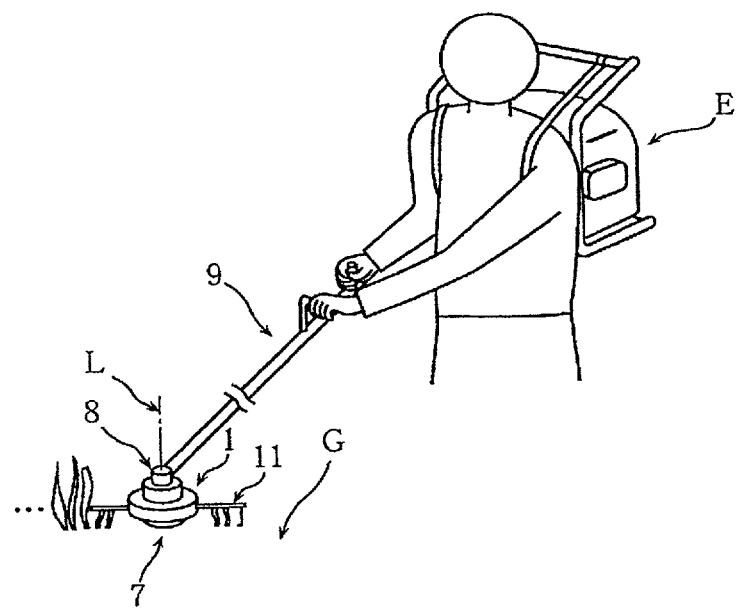
FIG. 1 An explanatory view of used state of an embodiment of the present invention.

The present invention will now be described according to the embodiments shown in the drawings.

Figure 2:
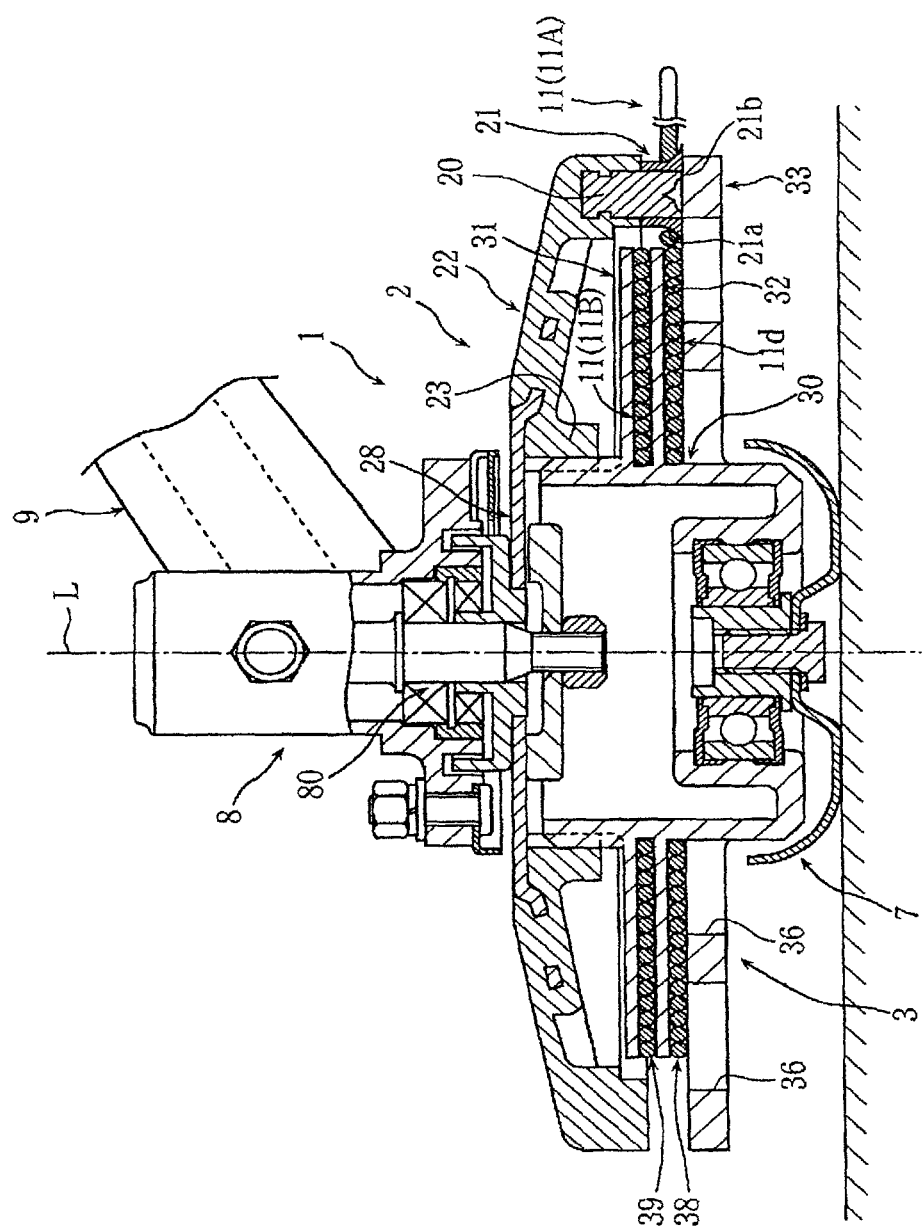
FIG. 2 A cross-sectional side view of a principal portion.

A mower of the present invention, as an embodiment shown in FIG. 1 and FIG. 2, is provided with a driving source E such as an engine, an operation rod 9 connected to the driving source E, a rotation transmitting member 8 disposed on a forth end of the operation rod 9 and having a driving shaft 80 rotated around a vertical axis L by the driving source E, a rotating body 1 rotated around the vertical axis L by the rotation of the driving shaft 80, and a bowl-shaped contact member 7 which freely idles around the vertical axis L against the rotating body 1. Although not shown in Figures, the driving source E may be carried on a shoulder with belts.

The rotating body 1 is provided with an upper lid member 2 attached to the driving shaft 80 and a winding member 3 on which two mowing cords 11 of resin.

In FIG. 2, the upper lid member 2 has a cylindrical wall portion 23 on which a female screw is formed, a circular inner brim portion 28, protruding from the cylindrical wall portion 23, to which the driving shaft 80 is attached, a top portion 22 of circular outer brim protruding from the cylindrical wall portion 23, and plural contact shaft portions 21 protruding downward and disposed along a peripheral edge of the top portion 22.

The winding member 3 is provided with a cylinder portion 30, in which the two mowing cords 11 are wound (attached) and a male screw is formed on an upper end to screw into the cylindrical wall portion 23 of the upper lid member 2, a circular upper outer brim portion 31 protruding from the cylinder portion 30, and a circular lower outer brim portion 33 protruding from the cylinder portion 30 and larger than the upper outer brim portion 31 in diameter.

And, the rotating body 1 is constructed as that a lower face 21b of the contact shaft portion 21 becomes proximate to or contacts a peripheral end edge on the upper face of the lower outer brim portion 33 in a state in which the cylindrical wall portion 23 of the upper lid member 2 and the cylinder portion 30 of the winding member 3 are screwed.

Figure 3:
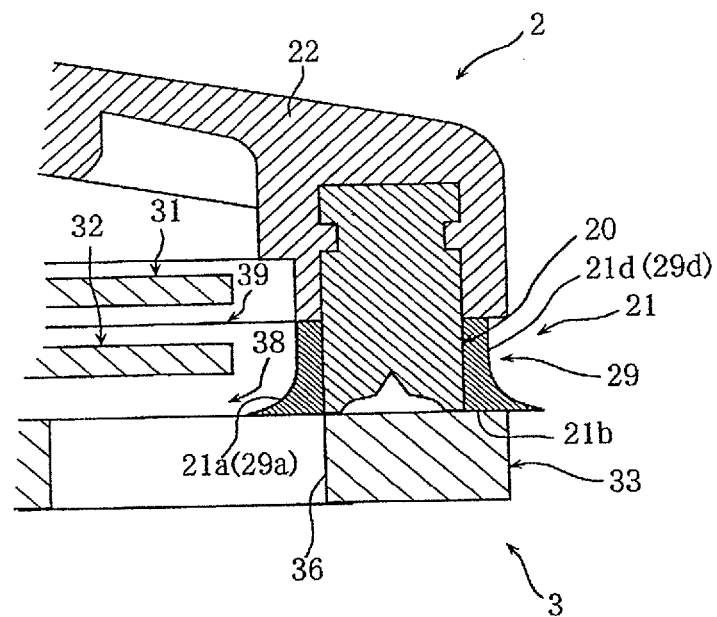
FIG. 3 An enlarged cross-sectional view of a principal portion of a rotating body.

In FIG. 3, the contact shaft portion 21 is composed of a shaft member 20 of metal fixed to the top portion 22 of resin by insert forming, and a cylindrical member 29 widening downward in diameter (having a bell-shaped lower end portion 29a) fit and fixed to a cylinder portion of the shaft member 20 protruding from the top portion 22.

The shaft member 20 is inserted (pressed in) to the cylindrical member 29, the lower end face of the shaft member 20 is fixed by caulking (press fitting) to fit and fix the cylindrical member 29 as not to rotate (non-rotatable) around the axis of the shaft member 20.

And, the cylindrical member 29 has a straight peripheral portion 29d continuing to the bell-shaped lower end portion 29a from the upper end to a middle portion.

The contact shaft portion 21 for adjustment of cord protruding length is formed by the fitting and fixation of the cylindrical member 29 to the shaft member 20. Further, a cord guiding brim portion 21a to prevent intrusion of the mowing cord 11 between the lower face 21b and (the upper face of) the lower outer brim portion 33 is formed on the lower end of the contact shaft portion 21 with the bell-shaped lower end portion 29a.

In the contact shaft portion 21, a straight peripheral portion (peripheral face) 21d is formed from the upper end to the middle portion, and the flaring cord guiding brim portion 21a is formed on the lower end (it can be also said that the contact shaft portion 21 has the flaring outer brim portion 21a).

The cord guiding brim portion 21a is formed into a concave arc of which radius of curvature is larger than a radius dimension of the mowing cord 11 in side view (cross-sectional view), and set as to smoothly guide the mowing cord 11 from the lower end side to the middle portion (the straight peripheral portion 21d). For example, the radius (dimension) of curvature is 1.1 to 2.5 times larger than the radius dimension of the mowing cord 11.

And, the contact shaft portions 21 are disposed on 3 or 2 positions around the vertical axis L with uniform intervals.

Figure 4:
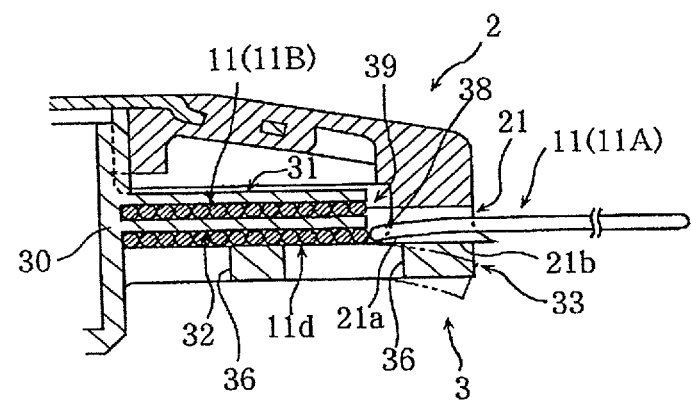
FIG. 4 A cross-sectional side view of a principal portion to explain the used state.

And, as shown in FIG. 2 through FIG. 4, the winding member 3 has a circular dividing outer brim portion 32, having approximately same diameter with the upper outer brim portion 31, between the upper outer brim portion 31 and the lower outer brim portion 33.

And, the winding member 3 has a first peripheral concave groove 38, formed with the cylinder portion 30, the lower outer brim portion 33, and the dividing outer brim portion 32, on which one of the two mowing cords 11 (11A) is wound. And, the winding member 3 has a second peripheral concave groove 39, formed with the cylinder portion 30, the upper outer brim portion 31, and the dividing outer brim portion 32, on which another of the two mowing cords 11 (11B) is wound. One mowing cord 11 is wound on the first peripheral concave groove 38 and one mowing cord 11 is wound on the second peripheral concave groove 39 respectively and dedicatedly.

The dimension between the lower outer brim portion 33 and the dividing outer brim portion 32 (width of the first peripheral concave groove 38), and the dimension between the upper outer brim portion 31 and the dividing outer brim portion 32 (width of the second peripheral concave groove 39), are similar and preferably set to be equal to or more than the diameter dimension of the mowing cord 11 and less than 2 times of the diameter dimension of the mowing cord 11. Further preferably, the width is made 1 to 1.5 times of the diameter dimension of the mowing cord 11. And, the width may be 1 to 1.25 times of the diameter dimension of the mowing cord 11.

By setting as described above, the winding portion 11d of the mowing cord 11 is aligned from the inner side to the outer side in diameter direction within the groove in cross section (without being layered in vertical direction). Although the mowing cord 11 shown in Figures has a circular cross-sectional configuration, a diagonal dimension is called diameter dimension and a half of the diagonal dimension is called radius dimension when the cross-sectional configuration is rectangular.

And, plural (many) window portions 36 opening in vertical direction for cooling are disposed through the lower outer brim portion 33.

Figure 6:
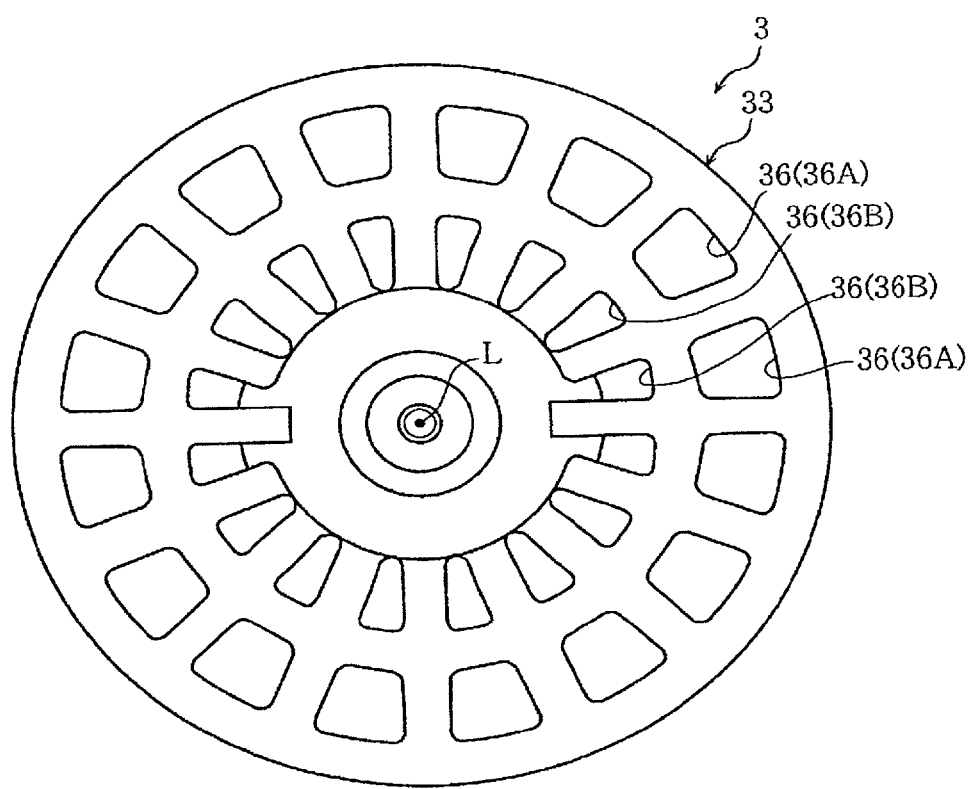
FIG. 6 A bottom view showing an example of a winding member.

As shown in FIG. 6, the window portions 36 are disposed with uniform intervals in the peripheral direction around the vertical axis L.

The many (more than 10) window portions 36 are composed of first window portions 36 (36A) disposed on the peripheral end edge side and second window portions 36 (36B) disposed on the center side to the first window portions 36A and smaller than the first window portions 36A.

The window portions 36 are disposed as to take the outside air into the lower portion of the rotating body 1 by the rotation, and emit the heat inside the rotating body 1 (in the storing space of the mowing cord 11 surrounded by the upper lid member 2 and the winding member 3).

The frictional heat in the winding portion 11d is reduced by the cooling function of the window portions 36, fusion in the winding portion 11d is prevented, and the mowing cord can be kept in the appropriate protruding state. With the window portions 36, appropriate for the lower outer brim portion 33 having a diameter dimension equal to or larger than 140 mm, cooling is further expected and effective.

Next, another embodiment of the present invention is described.

Figure 7:
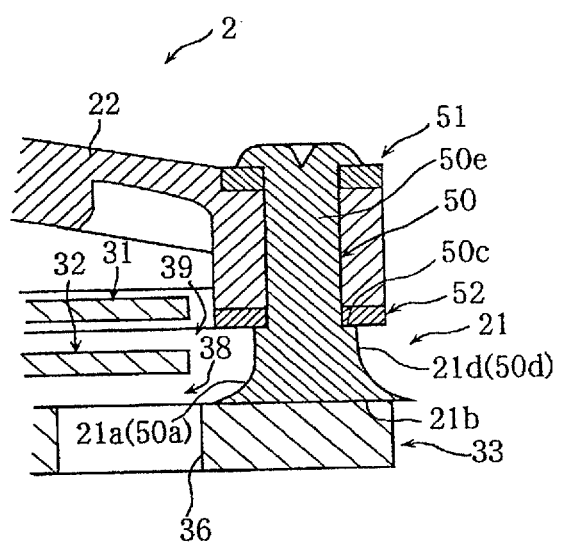
FIG. 7 An enlarged cross-sectional view of a principal portion showing another embodiment.

As shown in FIG. 7, in another embodiment, plural contact shaft members 50, penetrating the circular top portion 22 of the upper lid member 2 in vertical direction, are disposed along the peripheral edge.

The contact shaft member 50 has an insertion shaft portion 50e, of which upper end portion is protruding upward from the top portion 22 of resin and fixed to the top portion 22 by caulking with an upper washer member 51 of metal, a straight peripheral portion 50d formed (larger than the insertion shaft portion 50e in diameter) from the insertion shaft portion 50e with a staged portion 50c for positioning, and a bell-shaped lower end portion 50a formed continuously from the straight peripheral portion 50d as to enlarge downward in diameter.

The contact shaft member 50 is holding the top portion 22 with the fixed portion by caulking on the upper end and the staged portion 50c, and fixed as not to rotate (non-rotatable) around an axis of the insertion shaft portion 50e. And, a lower washer member 52 is disposed between the top portion 22 and the staged portion 50c of the contact shaft member 50.

The contact shaft portion 21 is composed of a lower protruding portion protruding downward from the top portion 22 and the lower washer member 52. And, the bell-shaped lower end portion 50a of the contact shaft member 50 forms the cord guiding brim portion 21a of the contact shaft portion 21, and the straight peripheral portion 50d of the contact shaft member 50 forms the straight peripheral portion 21d of the contact shaft portion 21.

Next, method of use (function) of the mower of the above-described embodiments is described.

Figure 5:
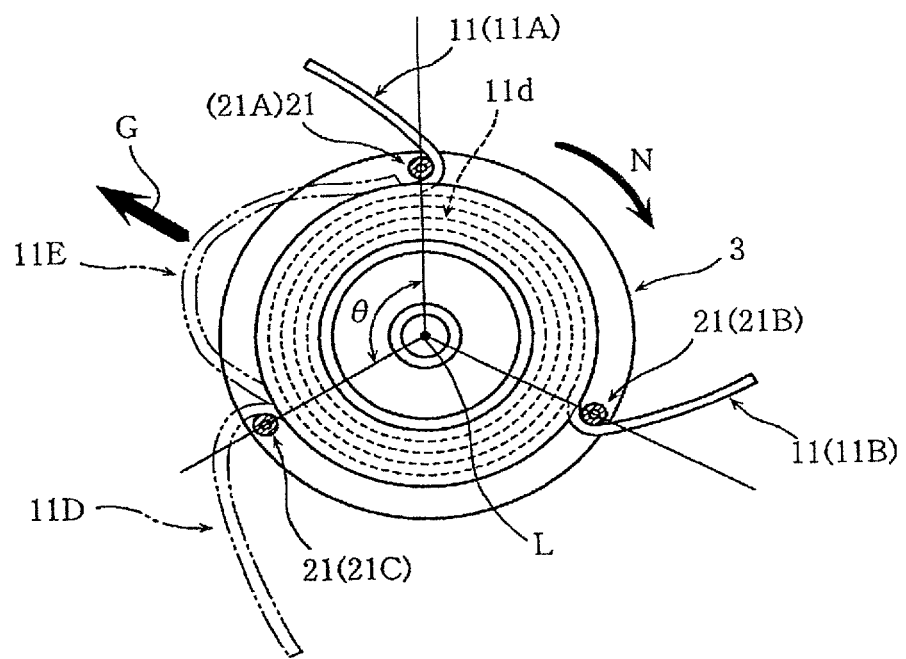
FIG. 5 A cross-sectional top view of a principal portion to explain the used state.

As shown in FIG. 4 and FIG. 5, one of the mowing cords 11 (11A), drawn out of the winding portion 11d in the first peripheral concave groove 38 by centrifugal force, is caught (hitched) by the contact shaft portion 21 (21A) disposed near the position of the drawing and on a downstream side of a rotation direction N to the beginning position of the drawing. Another of the mowing cords 11 (11B) is caught (hitched) by the contact shaft portion 21 (21B) disposed near the position of the drawing from the second peripheral concave groove 39 and on the downstream side of the rotation direction N to the beginning position of the drawing of the cord.

When the protruding length of the mowing cord 11A is made short by friction, etc., the cord receives strong influence of centrifugal force G as a mowing cord E shown with two-dot broken lines shown in FIG. 5, the cord passing between the contact shaft portion 21A and the winding portion 11d is drawn out of the winding portion 11d and hitched by the contact shaft portion 21C on the downstream side of the rotation direction N to the passed contact shaft portion 21A as a mowing cord 11D shown with two-dot broken lines, and the protruding length of the cord is automatically regulated.

Figure 8:
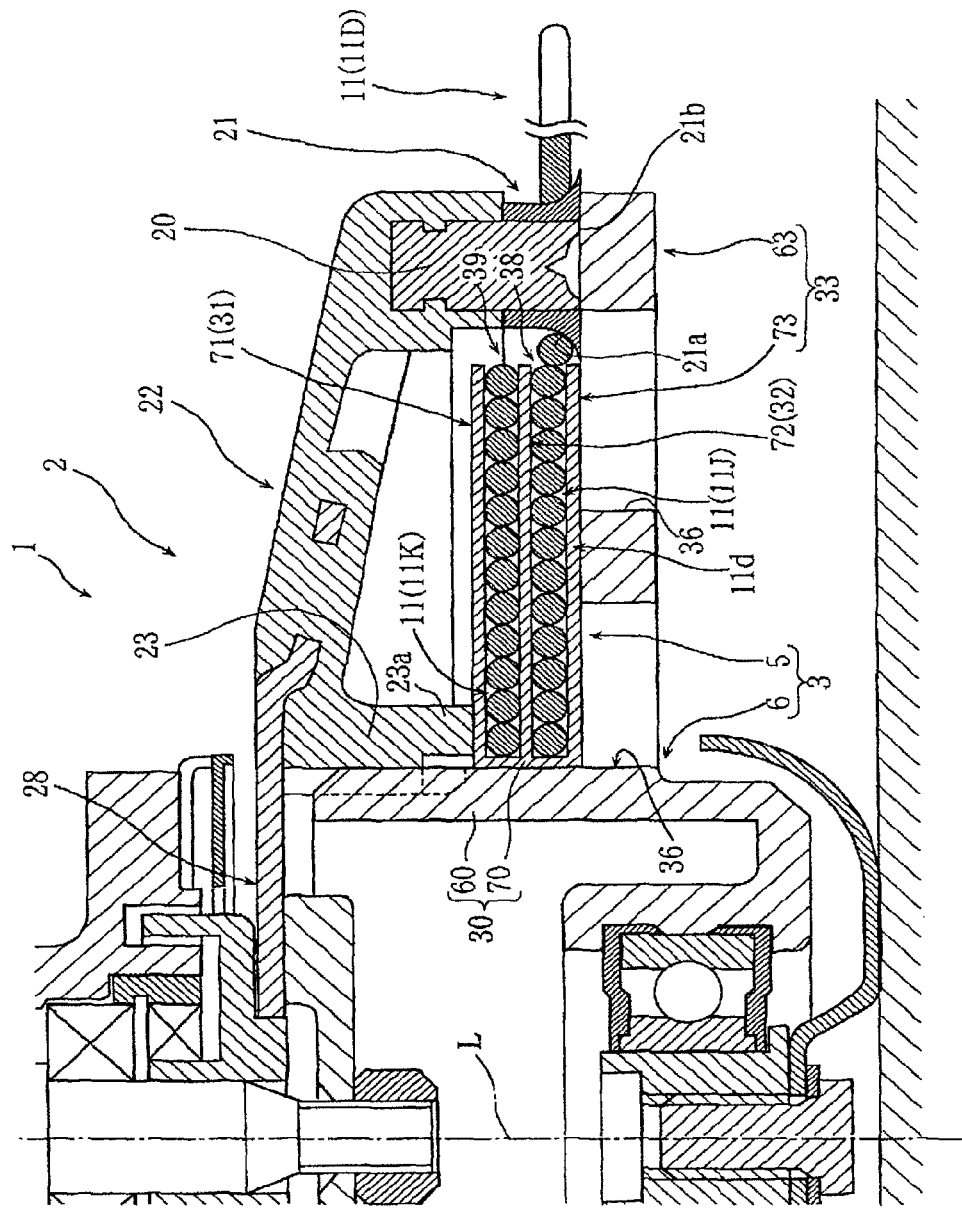
FIG. 8 A cross-sectional side view of a principal portion showing a further embodiment.
Figure 14:
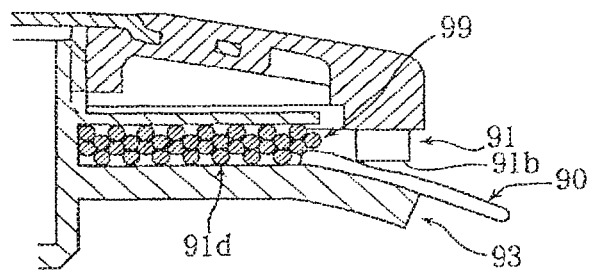
FIG. 14 A cross-sectional side view of a principal portion to explain a used state of a conventional example.
Figure 15:
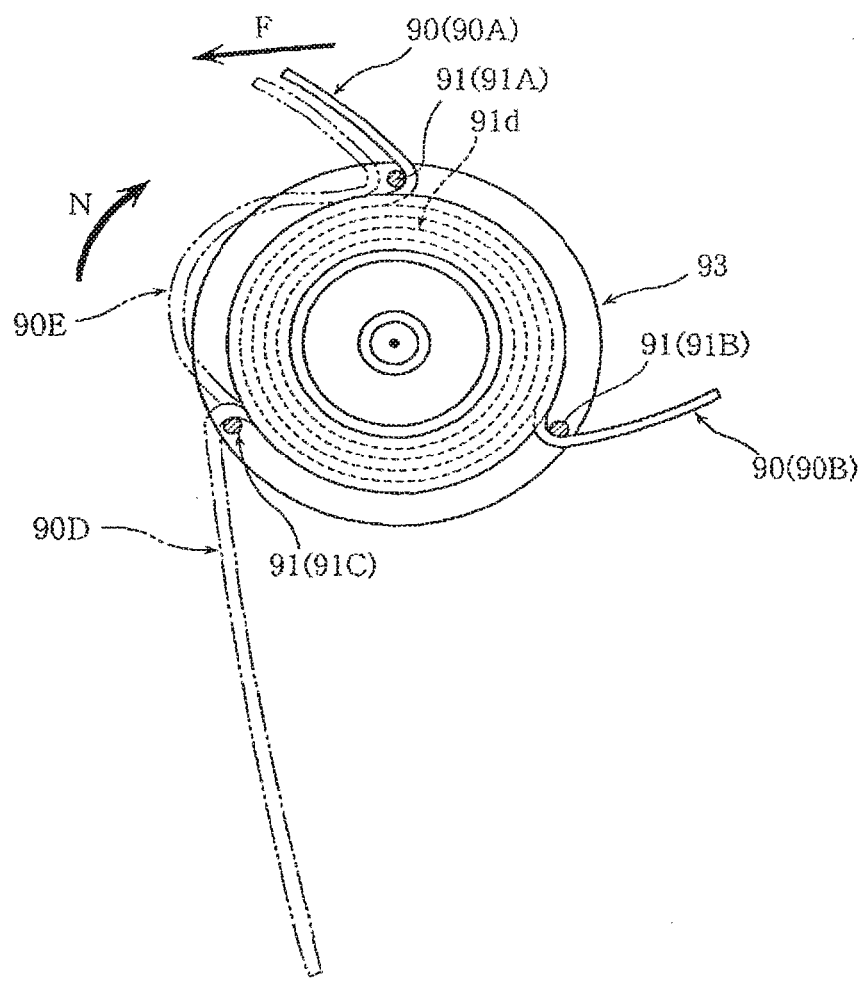
FIG. 15 A cross-sectional top view of a principal portion to explain a used state of a conventional example.

Conventionally, as shown in FIG. 14 and FIG. 15, in case that a gap is generated between a lower face 91b of a contact shaft portion 91 and a lower outer brim portion 93 by abrasion and deterioration of long-term use, or the protruding portion of the mowing cord 90 receives strong pulling force F by contact with grass and trees, the mowing cord 90, from the appropriate protruding state as shown in FIG. 8, intrudes between the lower face 91b of the contact shaft portion 91 and the lower outer brim portion 93 like a wedge before the protruding portion is abraded (or cut), passes the lower face 91b of the contact shaft portion 91 side by wedge function, and goes beyond the contact shaft portion 91 (91A) as the mowing cord E shown with two-dot broken lines. Then, the cord is drawn out of a winding portion 91d until being hitched by a contact shaft portion 91C on a downstream side of rotation direction N to the passed contact shaft portion 91A, and made inappropriate protruding state as a mowing cord 90D shown with two-dot broken lines.

And, conventionally, the cords tend to entangle and fusion tends to be generated by frictional heat in the winding portion 91d because two mowing cords 90 are wound on one peripheral concave groove 99 and the lower outer brim portion 93 has no windows as shown in FIG. 14.

However, in the present invention, as shown in FIG. 4 with two-dot broken lines, even in case that a gap is generated between the lower outer brim portion 33 and the contact shaft portion 21, or the cord receives strong pulling force, the cord guiding brim portion 21a of the contact shaft portion 21 guides the mowing cord 11 to the middle portion or the upper end side of the contact shaft portion 21 to always prevent the intrusion between the lower face 21b of the contact shaft portion 21 and the lower outer brim portion 33. The protruding portion of the mowing cord 11 does not go beyond the contact shaft portion 21 (does not pass through the lower face 21b side), and the hitching state is kept until the cord becomes short (as not to be hitched) by abrasion.

And, the two mowing cords 11 are prevented from being entangled and fused by the dividing outer brim portion 32, and smoothly and independently drawn out of the winding portion 11d of the peripheral concave grooves 38 and 39. And, the window portions 36 cool the inner portion of the rotating body 1 to prevent the fusion of the mowing cords 11.

The appropriate protruding state means a state in which the protruding portion of the mowing cord 11 is kept hitched to the contact shaft portion 21 until the cord 11 becomes short by abrasion, etc. as not to be hitched to the contact shaft portion 21, and the mowing cord 11 protrudes without entanglement and lumps by fusion.

The inappropriate protruding state means a state in which the protruding length of the mowing cord 11 (the length out of the lower outer brim portion 33) is longer than the diameter dimension of the lower outer brim portion 33. Or, in case that three contact shaft portions 21 are disposed, a state in which the protruding length is equal to or longer than 1.3 times of ⅓ of the circular length of the winding portion 11d of the mowing cord 11 (an arc length of a central angle θ of 120°), and, in case that two contact shaft portions 21 are disposed, a state in which the protruding length is equal to or longer than 1.3 times of ½ of the circular length of the winding portion 11d of the mowing cord 11 (an arc length of a central angle θ of 180°). And, the inappropriate protruding state includes states in which the mowing cords 11 are protruding with entanglement or fusion, and the cords can't protrude because the ends of the cords can't be departed from the winding portion 11d with fusion and entanglement.

Next, a further embodiment of the mower of the present invention is described.

In FIG. 8, the winding member 3 is provided with a ring member 5 of metal having a first peripheral concave groove 38 and a second peripheral concave groove 39, and a rotating main body member 6 of resin having the cylindrical trunk portion 60 screwed to the upper lid member 2. And, the ring member 5 is mounted on the cylindrical trunk portion 60 of the rotating main body member 6.

The ring member 5 has a short cylinder portion 70 on which the mowing cord 11 is wound, and, an upper end brim portion, a middle brim portion 72, and a lower end brim portion 73 (as outer brims) protruding radially outward from an upper end, a middle, and a lower end of the short cylinder portion 70.

That is to say, the winding member 3 has the first peripheral concave groove 38, composed of the short cylinder portion 70, the lower end brim portion 73, and the middle brim portion 72, on which the mowing cord 11 is wound, and, the second peripheral concave groove 39, composed of the short cylinder portion 70, the upper end brim portion 71, and the middle brim portion 72, on which the mowing cord 11 is wound.

And, the width dimension of the first peripheral concave groove 38 (a dimension between the lower end brim portion 73 and the middle brim portion 72) and the width dimension of the second peripheral concave groove 39 (a dimension between the upper end brim portion 71 and the middle brim portion 72) are similar and preferably set to be equal to or more than the diameter dimension of the mowing cord 11 (line diameter) and less than 2 times of the diameter dimension of the mowing cord 11. Further preferably, the width dimension is made 1 to 1.5 times of the diameter dimension of the mowing cord 11. And, the width dimension may be 1 to 1.25 times of the diameter dimension of the mowing cord 11.

By setting as described above, within each of the concave grooves 38 and 39 (within one of the grooves) in cross section, the winding portion 11d of the mowing cord 11 is aligned from the inner side to the outer side in diameter direction (without being layered in vertical direction). Although the mowing cord 11 shown in Figures has a circular cross-sectional configuration, a diagonal dimension is called diameter dimension and a half of the diagonal dimension is called radius dimension when the cross-sectional configuration is rectangular.

The rotating main body member 6 has a base outer brim portion 63 protruding radially outward from a lower side of the cylindrical trunk portion 60, a male screw portion on an upper end side of the cylindrical trunk portion 60 to screw into a female screw of the cylindrical wall portion 23 of the upper lid member 2, and a straight peripheral wall portion on a middle portion of the cylindrical trunk portion 60.

The ring member 5 is attached as to be mounted to the straight peripheral wall portion of the cylindrical trunk portion 60 of the rotating main body member 6 and placed on the base outer brim portion 63. And, the ring member 5 is pressed (downward) to the base outer brim portion 63 by a pushing protruding portion 23a protruding downward from the top portion 22 (the cylindrical wall portion 23) of the upper lid member 2. That is to say, the ring member 5 is attached by clamping in vertical direction with the upper lid member 2 and the base outer brim portion 63.

And, the ring member 5 can be attached by insertion to the cylindrical trunk portion 60 of the rotating main body member 6 from the upper side (in a state that the upper lid member 2 is not screwed), and can be drawn out upward after the attachment. That is to say, the ring member 5 is constructed as to be freely attached to and detached from the rotating main body member 6. And, in case that the mowing cord 11 becomes short by abrasion, etc. and the appropriate protruding state becomes impossible, the ring member 5 is constructed as to be freely changed with another ring member 5 for change on which the mowing cord 11 is preliminarily wound (before attachment). The other ring member 5 on which the mowing cord 11 is preliminarily wound is called a change cassette in some cases.

And, in the rotating body 1, the cylindrical trunk portion 60 of the rotating main body member 6 and the short cylinder portion 70 of the ring member 5 form the cylinder portion 30 of the winding member 3. And, the upper end brim portion 71 of the ring member 5 is the upper outer brim portion 31 of the winding member 3. The middle brim portion 72 of the ring member 5 is the dividing outer brim portion 32 of the winding member 3. The base outer brim portion 63 of the rotating main body member 6 and the lower end brim portion 73 of the ring member 5 form the lower outer brim portion 33 of the winding member 3. And, the window portions 36 are disposed on the base outer brim portion 63 of the rotating main body member 6. And, the contact shaft portion 21 for regulating the cord protruding length, described with FIGS. 2 through 5 and FIG. 7, is provided.

Figure 9:
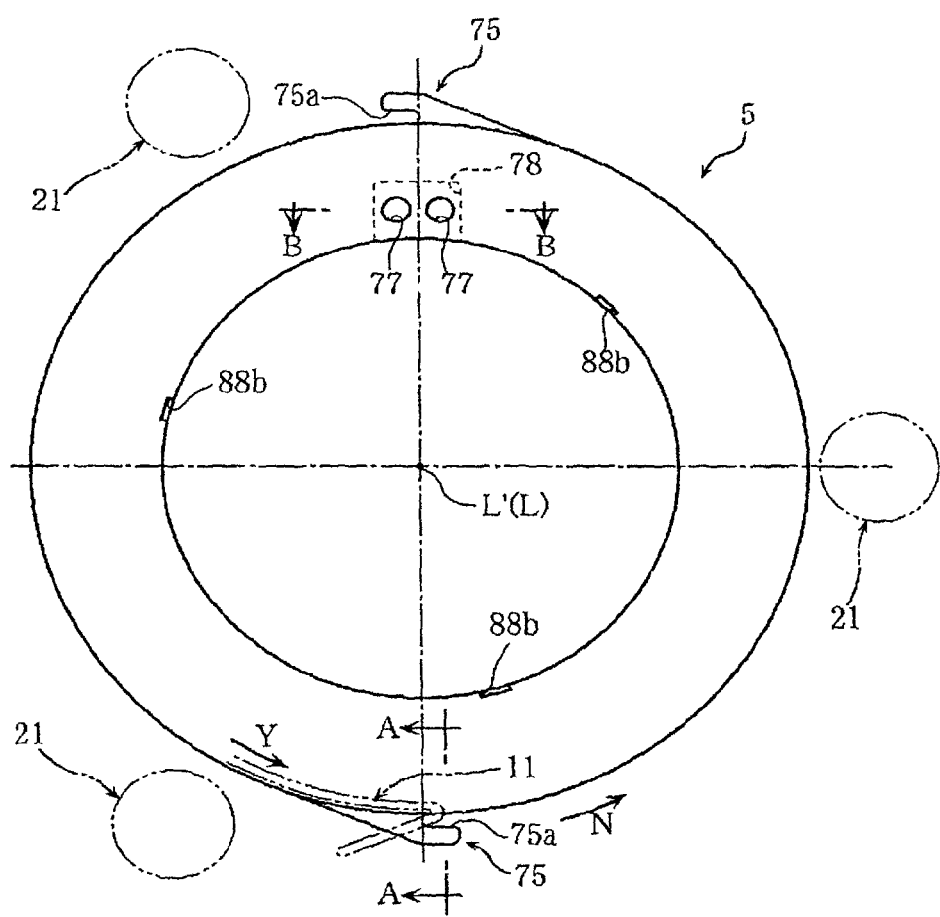
FIG. 9 A bottom view showing an example of a ring member.
Figure 10:
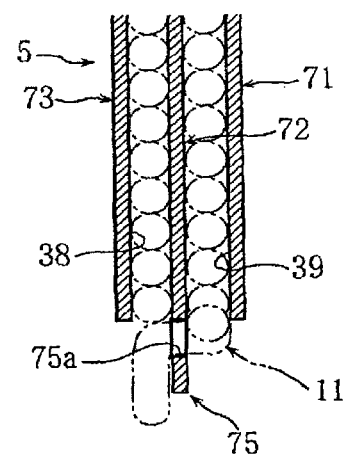
FIG. 10 A cross-sectional view of FIG. 9 on A-A line.
Figure 11:
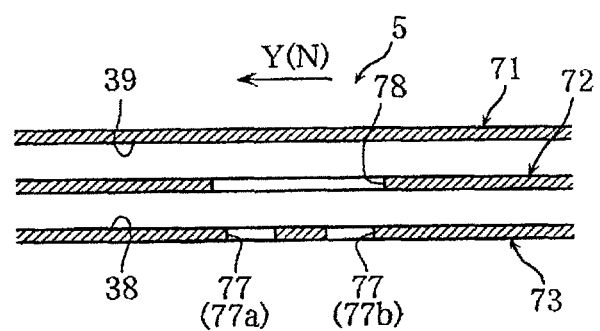
FIG. 11 A cross-sectional view of FIG. 9 on B-B line.

In FIG. 9 and FIG. 10, the ring member 5 has a hitching protruding piece portion 75 to hitch the forth end (the end portion of winding) of the wound mowing cord 11. The hitching protruding piece portion 75 is continuing and protruding radially outward from the middle brim portion 72. As described above, with this disposition on the middle brim portion 72, the hitched mowing cord 11 can be held without large protrusion in an axial direction out of the upper end brim portion 71 and the lower end brim portion 73, and the change cassettes can be easily stored in a small storing space by stacking or standing like books.

The hitching protruding piece portion 75 has a hitching notched portion 75a which can hold the mowing cord 11 by contact friction. The notched dimension of the hitching notched portion 75a is set to be equal to or less than the diameter dimension of the mowing cord 11 as to increase the contact frictional force.

It is preferable to set the minimum value of the notched dimension to make the hitching easy equal to or more than 0.7 times of the diameter dimension of the mowing cord 11.

And, the opening (opening direction around a central axis L') of the hitching notched portion 75a is (the same direction of) the cord winding direction Y and the rotation direction N. That is to say, the mowing cord 11 in wound state is bent in U-shaped and hitched to the hitching protruding piece portion 75 to be prevented from dropping unexpectedly by winding back force of the mowing cord 11.

And, two units (one pair) of the hitching protruding piece portion 75 are disposed around the central axis L' with intervals of approximately 180°. They are disposed on positions (central angle positions) around the vertical axis L different from (not interfering with) that of the contact shaft portions 21 in an assembled state in which the ring member 5 is mounted on the rotating main body member 6.

And, the ring member 5 has a pair of through holes 77 on the lower end brim portion 73 (an inner peripheral edge portion of the lower end brim portion 73 near the short cylinder portion 70 to connect the first peripheral concave groove 38 and the outside. A through hole 77a and another through hole 77b are disposed proximately (proximate each other around the central axis L'). The through holes 77 are formed as that the mowing cord 11 can be inserted. And, the pitch dimension of the two through holes 77 is preferably set to be 2.1 to 5 times of the diameter dimension of the mowing cord 11 because a later-described U-turn exposed portion is not formed large.

And, the ring member 5 has a through window portion 78 on the middle brim portion 72 to connect the first peripheral concave groove 38 and the second peripheral concave groove 39.

The single through window portion 78 is disposed near the pair of through holes 77, having an opening area larger than total opening area of the two through holes 77, and connected to the two through holes 77 in vertical direction.

The two through holes 77 and the single through window portion 78 are used for attachment of the mowing cord 11 wound on the ring member 5.

The attachment method (construction) of the mowing cord 11 to the ring member 5 is hereby described.

Figure 12:
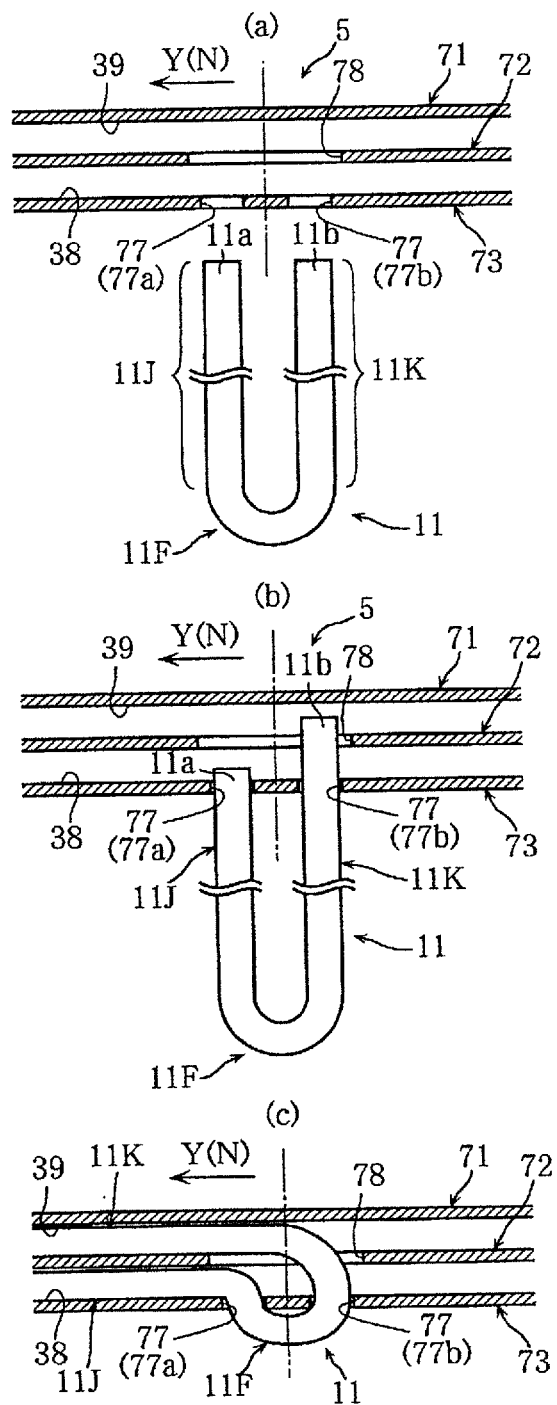
FIG. 12 Cross-sectional views of a principal portion in which (a) is a cross-sectional view of the principal portion before attachment, (b) is a cross-sectional view of the principal portion in an insertion state of the mowing cord, and (c) is a cross-sectional view of the principal portion in an attached state.

As shown in FIG. 12(a), a U-shaped portion 11F which is a middle portion of the mowing cord 11 bent U-shaped, a first cord portion 11J having an end portion 11a, and a second cord portion 11K having another end portion 11b, are formed.

As shown in FIG. 12(b), the end portion 11a is inserted to the through hole 77a and the first peripheral concave groove 38. And the end portion 11b is inserted to the through hole 77b, passed through the through window portion 78, and inserted to the second peripheral concave groove 39.

Then, the end portion 11a is pushed out of the first peripheral concave groove 38 radially outward. And, the end portion 11b is pushed out of the second peripheral concave groove 39 radially outward.

As shown in FIG. 12(c), the first cord portion 11J is wound on the first peripheral concave groove 38. And, the second cord portion 11K is wound on the second peripheral concave groove 39. The U-shaped portion 11F becomes a U-turn exposed portion to be hitched to a wall portion between the through holes 77a and 77b, and, the mowing cord 11 is prevented from dropping and attached to (wound on) the ring member 5. It is preferable to wind the first cord portion 11J and the second cord portion 11K as not to cross just after the insertion (as to cross after being wound on the short cylinder portion 70 more than 9/10).

Both end portions of one mowing cord can be easily and respectively wound on each of the two grooves. And, as shown in FIG. 8, the winding portion 11d of the mowing cord 11 can be easily wound as to be aligned from the inner side in the diameter direction to the outer side within a groove. The U-shaped portion 11F is disposed as to be inserted to the window portion 36 for cooling in the attached state in which the ring member 5 is mounted to the rotating main body member 6.

And, although not shown in Figures, the pair of through holes 77 may be formed on the upper end brim portion 71 to connect the second peripheral concave groove 39 and the outside, the end portion 11a of the mowing cord 11 may be inserted to the second peripheral concave groove 39 through one of the through holes 77, and the end portion 11b may be inserted to the first peripheral concave groove 38 through another of the through holes 77 to be wound. And, although two through window portions 78 can be formed with a pair of hole portions concentric and having same diameter with the pair of through holes 77, the work of passing the mowing cord 11 through the middle brim portion 72 is made easier with one large through window portion 78.

Figure 13:
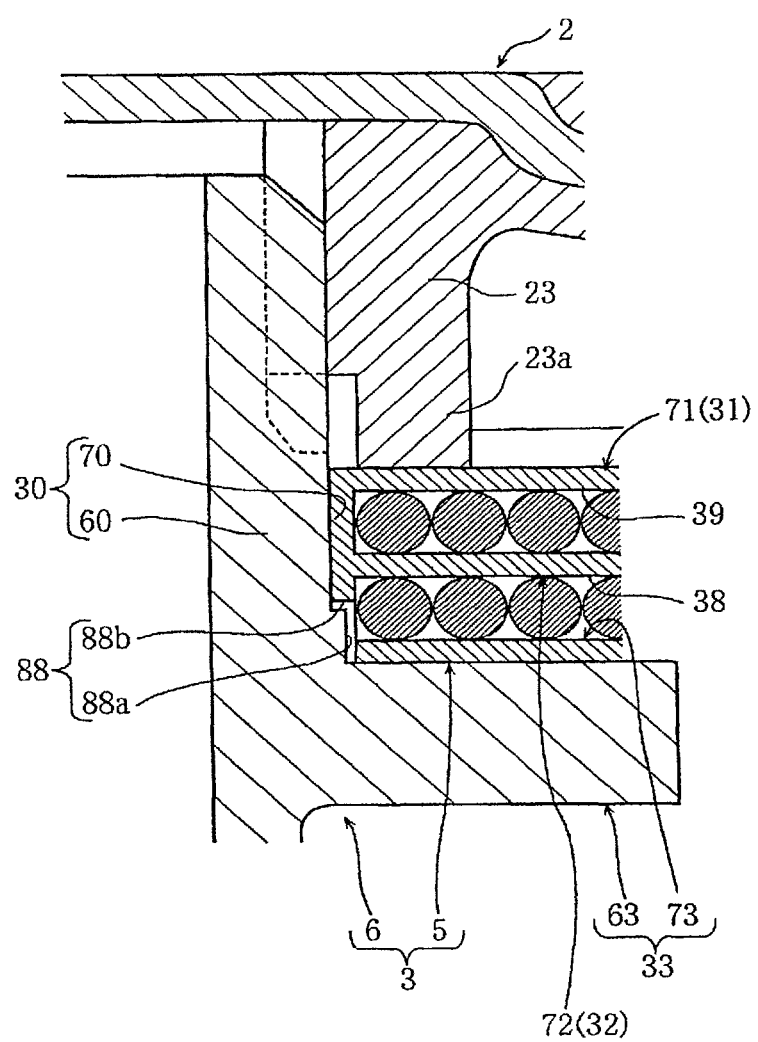
FIG. 13 A cross-sectional view of a principal portion showing an example of the ring member and a rotation stopping construction of a rotating main body member.

And, in FIG. 13, a rotation (turn)-stopping means (construction) 88 to prevent the ring member 5 from turning to the rotating main body member 6 is provided.

The rotation-stopping means 88 is provided with plural contact convex portions 88a each of which is protruding from a corner portion between the cylindrical trunk portion 60 of the rotating main body member 6 and the base outer brim portion 63 and disposed around the vertical axis L with uniform intervals, and an insertion concave portion 88b, notched on the inner peripheral lower end edge portion of the short cylinder portion 70 of the ring member 5 (refer to FIG. 9), to which the contact convex portions 88a are inserted. The contact convex portions 88a contact an inner side face (a side face around the central axis L') of the insertion concave portion 88b to prevent the ring member 5 from rotating (slipping) to the rotating main body member 6. The rotation-stopping means 88 may have a construction in which the rotation stopping is conducted by holding force of the pushing protruding portion 23a and the base outer brim portion 63.

Next, method of use (function) of the mower of the further embodiment is described.

Adding to the functions of the embodiments described with FIG. 2 through FIG. 7, in case that the mowing cord 11 is made short by abrasion, etc. and the appropriate protruding state is impossible, the ring member 5 can be detached from the rotating main body member 6 and changed with another ring member 5 for change on which the mowing cords 11 are wound in advance. Working efficiency is improved because it is unnecessary to wind new mowing cords 11 during the mowing work.

And, the first peripheral concave groove 38 and the second peripheral concave groove 39, on which the mowing cord 11 is wound, are formed with metal, and heat emitting ability (cooling ability) is better in comparison with resin, and fusion by frictional heat, etc. is further certainly prevented.

And, fusion with the groove wall portion (the brim portions and cylinder portions) is also prevented.

And, sufficient rigidity can be obtained even if the brim portions and cylinder portions forming the first and second peripheral concave grooves 38 and 39 are formed thin, and the winding member 3 can be formed thin as a whole.

The present invention may be modified, and configuration and disposition of the window portions 36 are freely selected. And, in the embodiment described with FIG. 8 through FIG. 13, the window portions 36 may be formed on the lower end brim portion 73 of the ring member 5.

As described above, the contact area of the cords on the winding portion 11d in cross section can be made small, and abrasion and fusion can be prevented because, in a mower in which the mowing cord 11 of resin is wound on the rotating body 1, the rotating body 1 is provided with the winding member 3 on which the mowing cord 11 is wound, the winding member 3 has the first peripheral concave groove 38 and the second peripheral concave groove 39 on which the mowing cord 11 is wound, and the winding portion 11d of the mowing cord 11 is wound as to be aligned from the inner side in the diameter direction to the outer side within each of the first peripheral concave groove 38 and the second peripheral concave groove 39. Entanglement of the mowing cords 11 can be prevented and the cords 11 can be smoothly sent out.

And, the cord 11 can be certainly and easily wound as the winding portion 11d is aligned from the inner side to the outer side in diameter direction within a groove (each of the concave grooves 38 and 39) because the groove width dimension of the first peripheral concave groove 38 and the groove width dimension of the second peripheral concave groove 39 are set to be equal to or more than the diameter dimension of the mowing cord 11 and less than 2 times of the diameter dimension of the mowing cord 11. In other words, the cord can be uniformly and neatly wound as to be layered in vertical direction within a groove, or without zigzag in vertical direction not being influenced by personal technique of workers.

And, the first and second peripheral concave grooves 38 and 39 has heat emitting ability (cooling ability) in comparison with resin, and fusion by frictional heat, etc. can be further certainly prevented because the winding member 3 is provided with the rotating main body member 6 of resin having a cylindrical trunk portion 60, and the ring member 5 of metal mounted on the cylindrical trunk portion 60 and having the first peripheral concave groove 38 and the second peripheral concave groove 39. Sufficient rigidity is obtained even if the brim portions and the cylinder portions, forming the first and second peripheral concave grooves 38 and 39, are formed thin, and the winding member 3 can be made thin as a whole. And, the rotating main body member 6 of resin can be made easily with light weight.

In case that the mowing cord 11 is made short by abrasion, etc. and the appropriate protruding state is impossible, the ring member 5 can be detached from the rotating main body member 6 and changed with another ring member 5 (cassette for change) for change on which the mowing cords 11 are wound in advance because the ring member 5 is detachably and changeably attached to the cylindrical trunk portion 60 of the rotating main body member 6. Therefore, it is unnecessary to wind new mowing cords 11 in intervals of mowing work, and working efficiency can be improved. In comparison with a case in which the mowing cords 11 are wound on the winding member 3 in which the rotating main body member 6 and the ring member 5 are unitedly formed (as the embodiment shown in FIG. 2), winding and change of the mowing cords 11 can be swiftly and easily conducted.

And, dropping of the mowing cord 11 from the ring member 5 is prevented, the end of the cord can be easily attached to the rotating main body member 6 without obstacles because the ring member 5 has the hitching protruding portion 75, to which the end of the wound mowing cord 11 is hitched, protruding outward in radial direction. Or, the mowing cord 11 does not drop out of the winding member 3 and can be easily stored in unused state. The wound state of the mowing cords 11 on the ring member 5 (the state instantly changeable as a cassette for change) can be kept for easy storing and preservation.

Both end portions of a mowing cord 11 are assigned to the first peripheral concave groove 38 and the second peripheral concave groove 39 to be wound certainly and neatly within a groove in a row (single line) because the ring member 5 has the short cylinder portion 70, and the upper end brim portion 71, the middle brim portion 72, and the lower end brim portion 73 protruding outward in radial direction from the upper end, the middle portion, and the lower end of the short cylinder portion 70, and the ring member 5 has the pair of proximate through holes 77 disposed on the upper end brim portion 71 or the lower end brim portion 73 for insertion of the mowing cord 11, and the through window portion 78 disposed on the middle brim portion 72 near the pair of through holes 77 to connect the first peripheral concave groove 38 and the second peripheral concave groove 39. It is not necessary to form a drop-prevention knot on the base end (beginning end of winding) of the mowing cord 11, and winding can be conducted easily and swiftly.

The mowing cord 11 can be prevented from protruding unnecessarily long out of the rotating body 1 because, in a mower in which the mowing cord 11 of resin is wound on the rotating body 1, the rotating body 1 is provided with the upper lid member 2 and the winding member 3 having the cylinder portion 30 on which the mowing cord 11 is wound, the winding member 3 has the upper outer brim portion 31 protruding from the cylinder portion 30 and the lower outer brim portion 33 larger than the upper outer brim portion 31 in diameter, the upper lid member 2 has plural contact shaft portions 21 for adjustment of cord protruding length protruding downward along the periphery, and the contact shaft portion 21 has the cord guiding brim portion 21a on the lower end to prevent intrusion of the mowing cord 11 between the lower face 21b of the contact shaft portion 21 and the lower outer brim portion 33. Entanglement and fusion by frictional heat can be prevented, and mowing work can be easily and smoothly conducted with good efficiency.

The mowing cord 11 can be prevented from protruding unnecessarily long out of the rotating body 1 because, in a mower in which the mowing cord 11 of resin is wound on the rotating body 1, the rotating body 1 is provided with the upper lid member 2 and the winding member 3 having the cylinder portion 30 on which the mowing cord 11 is wound, the winding member 3 has the upper outer brim portion 31 protruding from the cylinder portion 30 and the lower outer brim portion 33 larger than the upper outer brim portion 31 in diameter, the upper lid member 2 has plural shaft members 20 protruding downward along the periphery, and the contact shaft portion 21 for adjustment of cord protruding length is formed on the upper lid member 2 by fitting and fixation of the cylindrical member 29 widening downward in diameter onto the shaft member 20, and the cord guiding brim portion 21a is formed on the lower end of the contact shaft portion 21 to prevent intrusion of the mowing cord 11) between the lower face 21b of the contact shaft portion and the lower outer brim portion 33. Entanglement and fusion can be prevented, and mowing work can be easily and smoothly conducted with good efficiency. And, the contact shaft portion 21 having the cord guiding brim portion 21a can be easily formed (assembled).

The mowing cord 11 can be prevented from protruding unnecessarily long out of the rotating body 1 because, in a mower in which the mowing cord 11 of resin is wound on the rotating body 1, the rotating body 1 is provided with the upper lid member 2 and the winding member 3 having the cylinder portion 30 on which the mowing cord 11 is wound, the winding member 3 has the upper outer brim portion 31 protruding from the cylinder portion 30 and the lower outer brim portion 33 larger than the upper outer brim portion 31 in diameter, the upper lid member 2 has plural contact shaft members 50, penetrating the circular top portion 22 in vertical direction, along the periphery, the contact shaft member 50 has the insertion shaft portion 50e, protruding upward from the top portion 22, of which upper end is fixed to the top portion 22 by caulking, and the bell-shaped lower end portion 50a protruding downward from the top portion 22 and formed widening downward in diameter, the contact shaft portion 21 for adjustment of cord protruding length is formed with the downward protruding portion of the contact shaft member 50 on the upper lid member 2, and the cord guiding brim portion 21a is formed with the bell-shaped lower end portion 50a on the lower end of the contact shaft portion 21 to prevent intrusion of the mowing cord 11 between the lower face 21b of the contact shaft portion 21 and the lower outer brim portion 33. Entanglement and fusion can be prevented, and mowing work can be easily and smoothly conducted with good efficiency. And, the contact shaft portion 21 having the cord guiding brim portion 21a can be easily formed (assembled). The top portion 22 of the upper lid member 2 can be easily formed with resin.

EXPLANATION OF THE MARKS

1 A rotating body
2 An upper lid member
3 A winding member
5 A ring member
6 A rotating main body member
11 A mowing cord
11d A winding portion
20 A shaft member
21 A contact shaft portion
21a A cord guiding brim portion
21b A lower face
22 A top portion
29 A cylindrical member
30 A cylinder portion
31 An upper outer brim portion
33 A lower outer brim portion
38 A first peripheral concave groove
39 A second peripheral concave groove
50 A contact shaft member
50a A bell-shaped lower end portion
50e An insertion shaft portion
60 A cylindrical trunk portion
70 A short cylinder portion
71 An upper end brim portion
72 A middle brim portion
73 A lower end brim portion
75 A hitching protruding portion
77 A through hole
78 A through window portion

The invention claimed is:

1. A rotating body for mower for winding a mowing cord of resin, comprising a construction in which:
   a winding member, on which the mowing cord is wound, is provided;
   the winding member has a first peripheral concave groove and a second peripheral concave groove on which the mowing cord is wound, and a winding portion of the mowing cord is wound as to be aligned from an inner side in a diameter direction to an outer side within each of the first peripheral concave groove and the second peripheral concave groove;
   the winding member is provided with a rotating main body member of resin having a cylindrical trunk portion, and a ring member of metal mounted on the cylindrical trunk portion and having the first peripheral concave groove and the second peripheral concave groove;
   the ring member has a short cylinder portion, and an upper end brim portion, a middle brim portion, and a lower end brim portion protruding outward in radial direction from an upper end, a middle portion, and a lower end of the short cylinder portion; and
   the ring member has a pair of proximate through holes disposed on the upper end brim portion or the lower end brim portion for insertion of the mowing cord, and a through window portion disposed on the middle brim portion near the pair of through holes to connect the first peripheral concave groove and the second peripheral concave groove.

2. The rotating body for mower as set forth in claim 1, wherein the ring member is detachably and changeably attached to the cylindrical trunk portion of the rotating main body member.

3. The rotating body for mower as set forth in claim 2, wherein the ring member has a hitching protruding portion, to which an end of the wound mowing cord is hitched, protruding outward in radial direction.

4. The rotating body for mower as set forth in claim 1, wherein the ring member has a hitching protruding portion, to which an end of the wound mowing cord is hitched, protruding outward in radial direction.

* * * * *